United States Patent [19]

Megahed et al.

[11] 4,015,056
[45] Mar. 29, 1977

[54] METHOD OF MANUFACTURING A STABLE DIVALENT SILVER OXIDE DEPOLARIZER MIX

[75] Inventors: El Sayed Megahed, Madison; Patrick Joseph Spellman, Middleton, both of Wis.

[73] Assignee: ESB Incorporated, Philadelphia, Pa.

[22] Filed: Mar. 15, 1976

[21] Appl. No.: 666,656

[52] U.S. Cl. .............................................. 429/219
[51] Int. Cl.² ........................................ H01M 6/06
[58] Field of Search .................................. 429/219

[56] References Cited
UNITED STATES PATENTS 3,655,450   4/1972   Soto-Kiebs ................ 429/219 X

*Primary Examiner*—John H. Mack
*Assistant Examiner*—C. F. Lefevour
*Attorney, Agent, or Firm*—Anthony J. Rossi

[57] ABSTRACT

A method for manufacturing a stable divalent silver oxide depolarizer mix wherein the mix is treated with a mild reducing solution of a reducing agent such as methanol followed by a treatment with a strong reducing solution of a reducing agent such as hydrazine to form a layer of silver on the surface of the depolarizer mix. The depolarizer mix is specially prepared for use in a primary alkaline cell which is discharged at a single voltage plateau, and the preliminary treatment of the mix with the mild reducing solution permits the incorporation of greater amounts of divalent silver oxide in the mix, thereby increasing the electrochemical capacity while still providing a single voltage plateau discharge. The treatment with the mild reducing solution generally requires soaking the mix in a solution containing a reducing agent for up to about 10 minutes and may be carried out at either room or elevated temperature. The subsequent treatment with a strong reducing solution may also require up to about 10 minutes at either room or elevated temperature, with the purpose to provide a substantially continuous and electrolyte permeable layer of silver on the surface of the depolarizer mix. The depolarizer mix is particularly adapted for use in a "button" cell construction, and it may contain from about 50% by weight to about 100% by weight of divalent silver oxide and still provide a cell with a single voltage plateau discharge.

18 Claims, 1 Drawing Figure

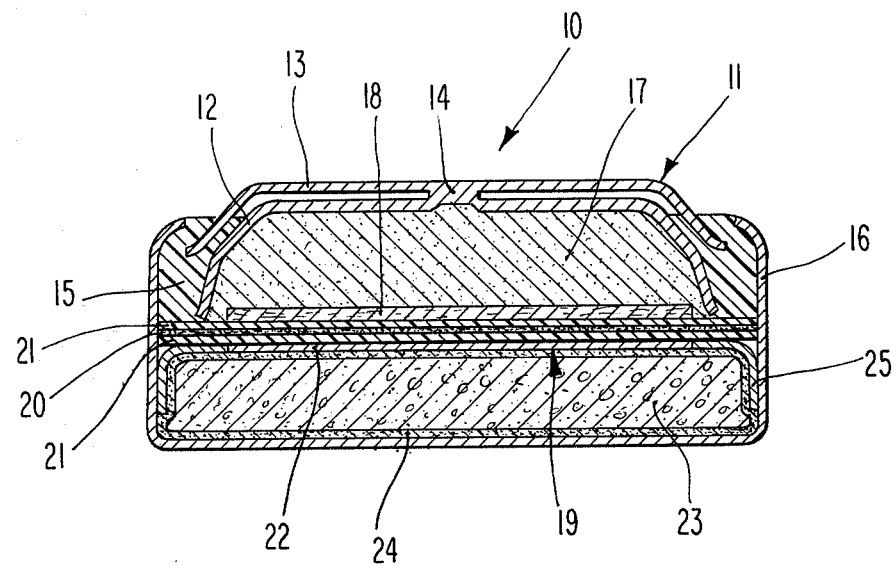

METHOD OF MANUFACTURING A STABLE DIVALENT SILVER OXIDE DEPOLARIZER MIX

BACKGROUND OF THE INVENTION

In the packaged power industry, there is an ever increasing emphasis upon the development of high capacity, small volume electric cells. The following is a comparison of the capacity and voltage for some active materials currently used in commercially available cells.

| Active Material | EMF vs. Zn in Alkaline Electrolyte | Capacity ma-hr./g | amp-hr./cc |
|---|---|---|---|
| HgO | 1.35 v. | 248 | 2.76 |
| $Ag_2O$ | 1.60 v. | 232 | 1.76 |
| AgO | 1.82 v. | 432 | 3.22 |

Divalent silver oxide (AgO) is an excellent high capacity battery active material, but it has two properties which have limited its use as a battery active material. During the discharge of a battery employing a divalent silver oxide positive active material, the initial voltage is at the higher divalent voltage level (1.82v. vs. Zn in alkaline electrolyte) until substantially all of the AgO is converted to $Ag_2O$, and thereafter, the discharge continues at the lower monovalent voltage level (1.60v. vs. Zn in alkaline electrolyte). This two plateau voltage level during discharge cannot be tolerated by many types of battery operated equipment.

Another problem encountered when using divalent silver oxide as the depolarizer (positive active material) is its lack of stability when in contact with aqueous alkaline solutions. It is well known that divalent silver oxide evolves oxygen when in contact with aqueous alkaline solutions, and this gassing phenomenon causes self-discharge of the divalent silver oxide, converting it to monovalent silver oxide or metallic silver. Divalent silver oxide cannot be used as the positive active material in hermetically sealed cells because of this instability in alkaline solutions and the consequent hazard of pressure build-up and possible cell rupture.

The problem of the two plateau voltage level during the electrical discharge of divalent silver oxide has previously been overcome by the inventions disclosed in U.S. Pat. Nos. 3,615,858 and 3,655,450 issued to Luis Soto-Krebs. These patents disclose a battery having a positive electrode comprising a principal active material (e.g. divalent silver oxide) and a secondary active material (e.g. monovalent silver oxide) whose discharge product is readily oxidized by the principal active material in the presence of alkaline electrolyte, and wherein the sole electronic path of discharge of the principal active material is through the secondary active material. The battery invented by Soto-Krebs is characterized throughout discharge by the potential of the secondary active material ($Ag_2O$) vs. the negative electrode in the alkaline electrolyte. The battery has the advantage of a single voltage level during electrical discharge and also the increased capacity provided by the divalent silver oxide positive active material.

The problem of the divalent silver oxide instability has been overcome by the invention disclosed in U.S. Pat. Nos. 3,476,610 and 3,484,295 issued to Luis Soto-Krebs and Robert Dawson. These patents disclose a battery having a positive electrode comprising a principal active material (e.g. divalent silver oxide) and a secondary active material (e.g. monovalent silver oxide) employed as a substantially electrolyte impermeable layer interposed between the principal active material and the battery components containing the electrolyte. This construction isolates the principal active material from contact with the electrolyte until the secondary active material is discharged, thereby providing improved stand or shelf life.

There are two patents which disclose methods for treating divalent silver oxide to provide alkaline batteries having a single voltage plateau during discharge. U.S. Pat. No. 3,055,964 issued to Frank Solomon and Kenneth Brown, discloses a process for treating an oxidized silver electrode containing argentic (divalent) and argentous (monovalent) silver oxide which comprises heating the electrode to at least 50° C., and preferably 50° C. to 300° C., for 0.003 to 1000 hours. A treatment at 100° C. requires 1 hour and lower temperatures require substantially greater time. This high temperature, long duration treatment does provide a silver oxide electrode containing divalent silver oxide having a monovalent silver oxide potential during discharge.

German Pat. No. 1,496,361, issued to Yardney International Corp., also discloses a process for treating silver oxide electrodes containing divalent silver oxide for the purpose of providing alkaline batteries having a single voltage plateau during discharge. The process disclosed in the German patent comprises treating the silver oxide electrode with an aqueous silver nitrate solution to deposit a thin film of silver nitrate on the surface. Upon subsequent contact with alkaline electrolyte, a layer of monovalent silver oxide is formed on the surface of the electrode. The treatment with the silver nitrate solution requires up to an hour, with 5 to 10 minutes being sufficient if the solution is heated.

SUMMARY OF THE INVENTION

It is the general object of this invention to provide a method for manufacturing a stable divalent silver oxide depolarizer mix which is stable in alkaline electrolyte and which can be discharged at a single voltage plateau. Another object of the invention is to provide a method for treating a divalent silver oxide depolarizer mix with a mild reducing solution whereby a substantially greater amount of the depolarizer mix is divalent silver oxide which is discharged at the monovalent silver oxide voltage. A further object is to provide a divalent silver oxide depolarizer mix having improved gassing stability in alkaline electrolyte and improved voltage stability during discharge at the monovalent silver oxide voltage.

It has been discovered that a stable depolarizer mix can be prepared by treating the mix with a mild reducing solution followed by a treatment with a strong reducing solution to form a substantially continuous and electrolyte permeable layer of silver on the surface of the depolarizer mix. The depolarizer mix is used in primary alkaline cells having a zinc negative electrode with the silver layer adjacent to the separator, and these cells can be a discharged at a single voltage plateau with a maximum open circuit voltage of about 1.75 volts. It has been found that substantially greater amounts of divalent silver oxide can be incorporated in the depolarizer mix, amounts ranging from about 50% to about 100% by weight of AgO based on the total silver oxide content, and still achieve a single voltage plateau discharge if the mix is treated with a mild reducing solution prior to forming the silver layer.

The method of this invention comprises (1) forming a depolarizer mix containing divalent silver oxide, which may include monovalent silver oxide and additives for special purposes, (2) compressing the mix in a press to form a pellet, (3) treating the pellet with a mild reducing solution such as an alkaline solution of methanol and retaining the pellet in the reducing solution for several minutes, (4) consolidating the pellet in a cathode container by compression, and (5) treating the consolidated pellet/cathode container assembly with a strong reducing solution to form a layer of silver on the surface of the depolarizer mix. If desired, the treatment of the pellet with the mild reducing solution can be performed after the pellet is consolidated in the cathode container, but it must be done before the treatment with the strong reducing solution. The pellet may be treated with both the mild reducing solution and the strong reducing solution prior to consolidation in the cathode container. It is preferred to place a metal sleeve around the upper edge of the depolarizer mix pellet, and this may be done prior to consolidating the pellet in the cathode container. It is also preferred to dry the pellet after the treatment with the mild reducing solution and before consolidation in the cathode container. The depolarizer mix may be formed by physically mixing divalent silver oxide with other ingredients. including monovalent silver oxide, by oxidizing silver powder to form divalent silver oxide or a mixture thereof with monovalent silver oxide, or by partially reducing a divalent silver oxide composition, including in situ reduction with a reducing metal. e.g. cadmium or zinc.

The above and other objects and advantages of this invention will be more fully described in the description of the preferred embodiment, particularly when read in conjunction with the accompanying drawing which forms a part of this specification.

BRIEF DESCRIPTION OF THE DRAWING

FIG. 1 is a cross-sectional view of a primary alkaline cell, in completely assembled condition, employing a depolarizer mix made in accordance with this invention.

DESCRIPTION OF THE PREFERRED EMBODIMENT

This invention comprises a method for manufacturing a stable divalent silver oxide (AgO) depolarizer mix wherein the mix is treated with a mild reducing solution followed by a treatment with a strong reducing solution to form a substantially continuous and electrolyte permeable layer of silver on the surface of the depolarizer mix. The initial reducing solution is sufficiently mild that no substantial portion of the divalent silver oxide is reduced to silver under the treatment conditions whereby the electrochemical capacity of the depolarizer mix is not significantly reduced. It is preferred to carry out the mild reducing solution treatment with an alkaline solution of methanol, however, other mild reducing agents such as lower aliphatic alcohols having up to 8 carbon atoms (e.g. ethanol and propanol) may be used. Alternatively, it may be possible to use very dilute solution of a relatively strong reducing agent. This treatment may be carried out at room temperature or at elevated temperatures, up to the boiling point of the solution. The treatment with the mild reducing solution generally requires soaking the depolarizer mix in the reducing solution for up to about 10 minutes. Heating the reducing solution accelerates the reaction, and shorter times can be used for the treatment. Generally, the treatment is carried out by immersing the depolarizer mix in the mild reducing solution, however, a mild reducing vapor might be used to treat the depolarizer pellet. The mild reducing solution may be agitated during the treatment which tends to accelerate the reaction. The treatment with the mild reducing solution is of such short duration that it does not form the necessary layer of silver on the depolarizer mix. The treatment is primarily intended to stabilize the divalent silver oxide component without substantially reducing the capacity of the depolarizer mix.

A critical feature of this invention is the formation of a substantially continuous and electrolyte permeable layer of silver on the surface of the depolarizer mix by treating it with a strong reducing solution. The strong reducing solution must be sufficiently strong to reduce divalent silver oxide to silver metal under the treatment conditions, and examples of strong reducing agents which may be used are hydrazine, formaldehyde, tin chloride, iron sulfate, sulfurous acid, pyrogallol, oxalic acid, formic acid, ascorbic acid, tartaric acid and hydroxylamine. A methanol solution of hydrazine is preferred. The treatment with the strong reducing solution may require up to about 10 minutes, with from about 2–6 minutes being preferred, however, excessive treatment with the strong reducing solution can substantially reduce the capacity of the depolarizer mix. The treatment with the strong reducing solution is usually performed at room temperature, however, elevated temperatures may be used especially if it is desired to accelerate the reduction. A high proportion of AgO may require a longer treatment or treatment at elevated temperature.

It has been found that depolarizer mixtures containing less than about 50% by weight of divalent silver oxide may not require the mild reducing solution treatment to have a adequate stability and a single voltage plateau discharge. Depolarizer mixtures containing from about 50% to about 100% by weight of divalent silver oxide do require both treatments for improved stability, and depolarizer mixtures containing more than about 70% by weight of AgO require both treatments in order to provide a single voltage plateau discharge with a maximum open circuit voltage of about 1.75 volts. It is preferred that the depolarizer mix contain at least about 50% by weight of AgO.

The method of this invention comprises forming a divalent silver oxide mix by (1) physical mixing, (2) oxidizing silver or $Ag_2O$ powder, or (3) partially reducing a divalent silver oxide composition. The mix may also contain additives for special purposes such as polytetrafluoroethylene to function as a lubricant and a binder, silver powder as a stabilizer and gold hydroxide as a gassing suppressant. The ingredients may be mixed in a blender to form a homogeneous depolarizer mix which is then compressed in a press to form a pellet using a pressure ranging from about 40,000 to 60,000 psi. It is preferred to treat the pellet with a mild reducing solution by immersing it in the solution of a reducing agent (e.g. methanol) for several minutes. The pellet is dried and consolidated in a cathode container by compression using a consolidation pressure ranging from about 50,000 to about 70,000 psi. The treatment with the mild reducing solution can be deferred until after the pellet is consolidated in the container, however, this is not as effective because access to the divalent silver oxide is restricted. Since the substantially continuous and electrolyte permeable silver layer which is formed by treatment with a strong reducing solution is required only on the surface of the depolarizer mix adjacent to the separator, it is preferred to carry out the strong reducing treatment after the pellet is consolidated in the cathode container. Furthermore, since access to the divalent silver oxide is restricted by the container, this helps to prevent substantial reduction in the capacity of the depolarizer mix. If desired, the treatment with the strong reducing solution can be performed prior to consolidation of the pellet in the can, however, the strong treatment always follows the mild reducing treatment. It is preferred to place a metal sleeve around the upper edge of the depolarizer mix to protect it during the consolidation of the pellet in the cathode container and during the final sealing operation when the anode and cathode containers are assembled.

One of the objectives of this invention is to increase the energy density per unit weight or volume of the depolarizer mix and still achieve a single voltage plateau discharge and adequate stability in alkaline electrolyte. Maximum energy density is achieved by using only divalent silver oxide depolarizer material. It has been found that the depolarizer mix can contain as much as about 100% by weight of divalent silver oxide based on the total silver oxide content when manufactured in accordance with this invention and still provide an alkaline cell having acceptable stability and a single voltage plateau during discharge.

Referring now to FIG. 1, a "button" cell construction 10 is illustrated, for the depolarizer mixtures made in accordance with this invention are particularly adapted for use in this construction, and button cells were used to evaluate the divalent silver oxide depolarizer mixtures. These button cells are of the type currently used as a power source for electric watches, an application for which the primary alkaline cells having a divalent silver oxide depolarizer mix coated with a layer of silver are particularly effective.

The negative electrode (anode) container 11 comprises what is commonly referred to as a "double top." Two cans are placed in physical, electrical contact with each other, with the inner can 12 being nested in the outer 13 to form a tight friction fit. It is generally preferred to spot weld the cans together as indicated at 14 to maintain permanent electrical contact. The cans may be made from nickel-plated steel which has good corrosion resistance, however, other materials may be used and the surfaces of the cans can be given special coatings. The "double top" anode container is preferred for its superior leakage prevention properties, however, a single top container can be used. A collar or grommet 15 of nylon or polyethylene is molded onto the edge of the anode container 11 to electrically insulate it from the depolarizer (cathode) container 16. The negative electrode or anode 17 is a zinc active material in the form of a gel or semi-gel comprising finely divided zinc particles, a small amount of gelling agent such as sugar gum or carboxymethyl cellulose (e.g. 0.2% by weight) and a portion of the aqueous alkaline electrolyte solution.

The separator comprises an absorbent component 18 and a barrier material 19. It is preferred to use matted cotton fibers (commercially available under the trademark "Webril") as the absorbent component which also contains a portion of the alkaline electrolyte. The semi-permeable barrier material comprises a layer 20 of polyethylene grafted with methacrylic acid (commercially available under the trademark "Permion") sandwiched between layers 21 of cellophane. The absorbent component 18 is placed in contact with the zinc active material, and the barrier material is in contact with the silver layer 22 on the surface of the depolarizer mix 23 which is completely coated with a reduced layer 24 formed by treating the mix 23 with a mild reducing solution.

The depolarizer mix or cathode 23 comprises a mixture containing divalent silver oxide (AgO). The depolarizer mix may also contain monovalent silver oxide, generally contains polytetrafluoroethylene (commercially available under the trademark "Teflon") as a binder and lubricant, and silver powder for voltage stability. The mix may also contain a minor amount of a gas suppressant such as gold hydroxide to insure the stability of the divalent silver oxide.

The silver layer 22 is formed in situ on the depolarizer mix, after it is treated with a mild reducing solution (alkaline solution of 10% methanol) to form layer 24 and after it is consolidated in the cathode container 16, by immersing it in a strong reducing solution such as a 3% by weight hydrazine solution in methanol for about 5 minutes. A metal sleeve 25 is placed around the upper edge of the depolarizer mix, however, this is not an essential component of the button cell construction. The depolarizer mix 23 may comprise divalent silver oxide (AgO) which has a gray color and monovalent silver oxide ($Ag_2O$) which is deep purple to black in color. The reduced layer 24 ranges from dark brown to black and the silver layer 22 has a metallic silver color.

EXAMPLE 1

Primary cells having divalent silver oxide (AgO) depolarizer mixtures with AgO contents ranging from 50% by weight to 90% by weight were tested for electrical properties and stability. Depolarizer mixtures treated with both a mild reducing solution and a strong reducing solution in accordance with this invention were compared to mixtures treated with only the strong reducing solution. The mild reducing solution treatment comprised soaking the depolarizer mix pellets (prior to consolidation) for 1 minute at room temperature in a 90/10 solution of 30% aqueous KOH/methanol, followed by rinsing in distilled water, then tap water, and drying in hot air (about 50° C). The strong reducing solution treatment was performed after consolidating the pellets in the cathode container and comprised soaking the consolidations in a solution of 1% by weight hydrazine in methanol, with stirring, for 3 minutes at room temperature.

All of the cells (RW 44 size with a 0.450 inch cathode container diameter and a height ranging from 0.150 – 0.162 inches) used a 40% KOH + 1% ZnO electrolyte solution and had a construction as illustrated in FIG. 1, with a zinc gel anode and a separator comprising an absorbent (Webril) and a barrier material of polyethylene grafted with methacrylic acid between layers of cellophane. The depolarizer mix comprised the indicated percentage of AgO, 1.5% by weight of polytetrafluoroethylene (Teflon) lubricant and binder, and the balance was $Ag_2O$. The cells were tested for stability by measuring the change in space between the anode (top) and cathode (bottom) with a micrometer after storage at 71° C. for 7 days. The flash current was measured by electrically connecting a cell to a standard ammeter (having an internal resistance of about 0.015 ohms) and determining the current flow at 0.5 seconds. The following results were recorded, with all electrical readings being the average of 35–40 cells and the cell expansion data being the average of four cells.

| % AgO | Treatment | OCV | CCV (167 ohm) | Impedance (ohms) | Flash Current (amps) | Cell Expansion (mils) |
|---|---|---|---|---|---|---|
| 50 | Methanol/Hydrazine | 1.61 | 1.56 | 2.7 | 0.66 | 7 |
| 50 | Hydrazine | 1.61 | 1.54 | 13.8 | 0.63 | 7 |
| 60 | Methanol/Hydrazine | 1.61 | 1.54 | 8.4 | 0.61 | 7 |
| 60 | Hydrazine | 1.62 | 1.47 | 74.0 | 0.59 | 6 |
| 70 | Methanol/Hydrazine | 1.61 | 1.53 | 40.1 | 0.64 | 6 |
| 70 | Hydrazine | 1.84 | 1.46 | 100+ | 0.68 | 14 |
| 80 | Methanol/Hydrazine | 1.71 | 1.50 | 99.9 | 0.62 | 17 |
| 80 | Hydrazine | 1.85 | 1.50 | — | 0.63 | 16 |
| 90 | Methanol/Hydrazine | 1.85 | 1.50 | — | 0.61 | 16 |
| 90 | Hydrazine | 1.86 | 1.48 | 48.7 | 0.56 | 20 |

All of the cells up to and including 80% AgO which had been treated with both methanol and hydrazine had monovalent silver oxide open circuit voltages (about 1.75v. and below). Depolarizers containing at least 70% AgO which were treated only with hydrazine had the divalent silver oxide open circuit voltage. Depolarizer mixtures containing 90% AgO and receiving both treatments at room temperature also had a divalent silver oxide open circuit voltage.

EXAMPLE 2

Primary alkaline cells identical in size and construction to those in Example 1 were subjected to treatment with both methanol (mild reducing solution) and hydrazine (strong reducing solution) and compared to cells treated only with hydrazine. The methanol treatment was carried out in 90/10 30% aqueous KO/methanol solution for 1 minute, with some cells treated at room temperature and other cells at 80° C. All of the depolarizer mixtures contained 90% by weight AgO, 8.5% Ag$_2$O and 1.5% polytetrafluoroethylene. The following results were recorded, with each electrical measurement being the average of 35–40 cells and cell expansion data being the average of four cells.

| Pellet Treatment | OCV | CCV (167 ohms) | Impedance (ohms) | Flash Current (amps) | Cell Expansion (mils) 7 days at 71° C |
|---|---|---|---|---|---|
| Methanol at RT | 1.85 | 1.50 | — | 0.61 | 16 |
| None | 1.86 | 1.48 | 48.7 | 0.56 | 20 |
| Methanol at 80° C | 1.63 | 1.53 | 9.0 | 0.8 | 7 |
| None | 1.85 | 1.51 | 50.0 | 0.30 | 15 |

Only the depolarizer mix treated with methanol at 80° C had a monovalent silver oxide open circuit voltage, and it also had superior impedance, flash current and stability.

EXAMPLE 3

Primary alkaline cells (RW 44 size) having the construction illustrated in FIG. 1 with depolarizer mixes varying from 50% AgO to 95% AgO were evaluated to determine the effect of varying the duration of the methanol and hydrazine treatments. The methanol treatment comprised soaking the depolarizer pellets (prior to consolidation in the cathode container) for the indicated time in a 90/10 solution of 30% aqueous KOH/methanol, followed by rinsing in distilled water, tap water and drying in hot air (about 50° C.). The hydrazine treatment consisted of soaking depolarizer pellets consolidated in the cathode container in a solution of 1% by weight hydrazine in methanol, with stirring, for the indicated time. All reducing solution treatments were at room temperature. The anode was zinc gel and the electrolyte was an aqueous solution of 40% KOH + 1% ZnO.

The "AgO mix" consisted of 95.2% AgO, 3.0% silver powder, 1.5% polytetrafluoroethylene and 0.3% gold hydroxide Au(OH)$_2$. The following depolarizer mixtures were tested:

| Mix | Composition |
|---|---|
| A | 50% AgO mix, 49% Ag$_2$O, 1% Teflon powder |
| B | 70% AgO mix, 30% Ag$_2$O |
| C | 80% AgO mix, 20% Ag$_2$O |
| D | 100% AgO mix |

The mix sleeve was gold-plated steel. The following results were recorded, with each electrical value being the average of 30–35 cells and cell expansion data was the average of four cells.

| Mix | Methanol Time (Min.) | Hydrazine Time (Min.) | OCV | CCV (167 ohm) | Impedance (ohm) | Flash Current (amp) | Cell Expansion 2 wk at 71° C (mils) |
|---|---|---|---|---|---|---|---|
| A | 1 | 3 | 1.61 | 1.56 | 2.1 | 0.75 | 1.5 |
| B | 1 | 3 | 1.64 | 1.53 | 19.7 | 0.73 | 0.8 |
| B | 5 | 3 | 1.61 | 1.57 | 2.2 | 0.76 | 1.3 |
| B | 10 | 3 | 1.61 | 1.57 | 2.1 | 0.77 | 1.8 |
| B | 1 | 10 | 1.61 | 1.56 | 2.3 | 0.79 | 1.6 |

-continued

| Mix | Methanol Time (Min.) | Hydrazine Time (Min.) | OCV | CCV (167 ohm) | Impedance (ohm) | Flash Current (amp) | Cell Expansion 2 wk at 71° C (mils) |
|-----|---|---|---|---|---|---|---|
| B | 5 | 10 | 1.61 | 1.57 | 2.0 | 0.76 | 2.0 |
| B | 10 | 10 | 1.60 | 1.57 | 2.0 | 0.77 | 0.8 |
| C | 5 | 3 | 1.61 | 1.56 | 2.5 | 0.79 | 1.5 |
| C | 10 | 3 | 1.61 | 1.56 | 2.3 | 0.79 | 2.5 |
| C | 1 | 10 | 1.61 | 1.56 | 2.6 | 0.79 | 1.8 |
| C | 5 | 10 | 1.61 | 1.57 | 2.2 | 0.74 | 2.0 |
| C | 10 | 10 | 1.61 | 1.57 | 2.2 | 0.73 | 1.5 |
| D | 5 | 3 | 1.86 | 1.51 | 50.4 | 0.76 | 2.8 |
| D | 10 | 3 | 1.78 | 1.50 | 51.8 | 0.75 | 3.5 |
| D | 1 | 10 | 1.86 | 1.51 | 56.7 | 0.74 | 3.8 |
| D | 5 | 10 | 1.83 | 1.50 | 53.1 | 0.74 | 4.0 |
| D | 10 | 10 | 1.65 | 1.53 | 20.0 | 0.78 | 2.8 |

All cells were acceptable except those having 95% AgO, and increasing the methanol and hydrazine treatment time to 10 minutes reduced the OCV to 1.65 for the 95% AgO mix.

EXAMPLE 4

Treatment of the depolarizer pellet with both mild and strong reducing solutions after it was consolidated in the cathode container was evaluated for two depolarizer mixtures. The hydrazine treatment was in a solution of 1% hydrazine in methanol for 3 minutes at room temperature. The methanol treatment comprised immersing the consolidations in a 90/10 solution of 3% aqueous KOH/methanol at room temperature for the indicated time. The "AgO mix" composition was the same as in Example 3, the metal sleeve in all cells and silver plated, and the following depolarizers were tested:

| Mix | Composition |
|-----|---|
| A | 50% AgO mix, 49% Ag$_2$O, 1% Teflon |
| B | 100% AgO mix |

The following results were recorded, with each electrical value being the average of 40 cells and cell expansion data was the average of four cells:

| Mix | Pellet Treatment | Consolidation Treatment | OCV | CCV (167 ohm) | Impedance (ohm) | Flash Current (amp) | Cell Expansion 1 wk at 71° C (mils) |
|-----|---|---|---|---|---|---|---|
| A | Methanol-1 min. | Hydrazine | 1.62 | 1.55 | 2.3 | 0.76 | 2.7 |
| A | None | Methanol-5 min. & Hydrazine | 1.61 | 1.57 | 2 | 0.81 | 4.0 |
| A | None | Methanol-15 min. & Hydrazine | 1.61 | 1.57 | 2 | 0.82 | 3.3 |
| A | None | Methanol-60 min. & Hydrazine | 1.61 | 1.57 | 2 | 0.79 | 5.0 |
| B | None | Methanol-5 min. & Hydrazine | 1.86 | 1.51 | 60 | 0.70 | 10.7 |
| B | None | Methanol-15 min. & Hydrazine | 1.87 | 1.51 | 64 | 0.71 | 10.7 |
| B | None | Methanol-60 min. & Hydrazine | 1.86 | 1.52 | 58 | 0.74 | 9.3 |

The methanol and hydrazine treatment of the mix after consolidation in the container was effective for all depolarizers except the 95% AgO.

EXAMPLE 5

The effect of methanol treatment and hydrazine treatment on cell capacity (RW 44 size) was determined for various depolarizer mixtures and treatment times. In all cases, the hydrazine and methanol treatments were the same as those used in Example 1, with all reducing agent treatments carried out at room temperature. The AgO mix was the same as in Example 3. The following depolarizers were evaluated.

| Mix | Composition |
|-----|---|
| A | 70% AgO mix, 30% Ag$_2$O |
| B | 80% AgO mix, 20% Ag$_2$O |
| C | 95.2% AgO, 3% Ag, 1.5% Teflon, 0.3% Au(OH)$_2$ |
| D | 50% AgO mix, 49% Ag$_2$O, 1% Teflon powder |

The following results were recorded, with each value representing the average of three depolarizer pellets:

| Mix | Capacity Untreated Pellet mAH/q | mAH | Methanol Treatment Time (min.) | Post Methanol Capacity mAH/q | mAH | Hydrazine Treatment Time (min.) | Post Hydrazine Capacity mAH | mAH/q |
|-----|---|---|---|---|---|---|---|---|
| A | 359 | 220 | 1 | 357 | 221 | 3 | 208 | 335 |
| A | " | " | 5 | 349 | 212 | 3 | 208 | 335 |
| A | " | " | 10 | 345 | 214 | 3 | 196 | 316 |
| A | " | " | 1 | 357 | 221 | 10 | 194 | 313 |
| A | " | " | 5 | 349 | 212 | 10 | 197 | 317 |
| A | " | " | 10 | 345 | 214 | 10 | 197 | 317 |

-continued

| Mix | Capacity Untreated Pellet mAH/q | mAH | Methanol Treatment Time (min.) | Post Methanol Capacity mAH/q | mAH | Hydrazine Treatment Time (min.) | Post Hydrazine Capacity mAH | mAH/q |
|---|---|---|---|---|---|---|---|---|
| B | 376 | 233 | 5  | 367 | 228 | 3  | 208 | 335 |
| B | "   | "   | 10 | 360 | 220 | 3  | 207 | 334 |
| B | "   | "   | 1  | 375 | 239 | 10 | 208 | 335 |
| B | "   | "   | 5  | 367 | 228 | 10 | 203 | 327 |
| B | "   | "   | 10 | 360 | 220 | 10 | 209 | 337 |
| C | 412 | 256 | 5  | 403 | 246 | 3  | 229 | 369 |
| C | "   | "   | 10 | 394 | 240 | 3  | 225 | 363 |
| C | "   | "   | 1  | 409 | 245 | 10 | 223 | 359 |
| C | "   | "   | 5  | 403 | 246 | 10 | 220 | 355 |
| C | "   | "   | 10 | 394 | 240 | 10 | 212 | 342 |
| D | 329 | 204 | 1  | 317 | 200 | 3  | 187 | 302 |

All of these cells had acceptable stability during elevated temperature storage.

EXAMPLE 6

The effect of treating depolarizer mixtures with a mild reducing solution comprising an alkaline ethanol solution and an alkaline n-propanol solution was determined for mixtures containing 60% by weight AgO and 36.85% by weight of $Ag_2O$. All treatments with the mild reducing solution were performed by immersing the compressed pellet (not consolidated in the container) in the mild reducing solution for 5 minutes. Some of the pellet treatments were at room temperature (RT) and 60° C. After the treatment, the pellets were rinsed in distilled water, soaked in 30% KOH solution for 24 hours at room temperature, rinsed in tap and distilled water, and dried in hot air (about 50° C.) for about 10 minutes. Untreated pellets and pellets soaked in 3% KOH were used as standards. Some of the pellets were used to make 15 RW 44 cells using a 40% KOH electrolyte containing 1% ZnO. Prior to assembly of the cells, the pellets were consolidated in the cathode container and treated with a strong reducing solution consisting of 1% by weight hydrazine in methanol for 3 minutes. The following results were recorded:

| Reducing Solution | Temp. | Soak in 30% KOH | Pellet Capacity mAH/g | Impedance (ohms) | Average OCV | CCV | Flash Current (amps) |
|---|---|---|---|---|---|---|---|
| None |  | No | 338 | 44.0 | 1.77 | 1.52 | 0.56 |
| 30% KOH | 80° C. | Yes | 345 | 44.8 | 1.75 | 1.52 | 0.55 |
| 20% Ethanol in 30% KOH | RT | Yes | 339 | 5.9 | 1.62 | 1.54 | 0.58 |
| 20% Ethanol in 30% KOH | 60° C. | Yes | 330 | 3.8 | 1.62 | 1.55 | 0.58 |
| 40% Propanol in 30% KOH | RT | Yes | 340 | 4.9 | 1.62 | 1.55 | 0.61 |
| 40% Propanol in 30% KOH | 60° C. | Yes | 338 | 11.2 | 1.62 | 1.54 | 0.61 |

The ethanol and n-propanol treatments reduced the OCV to 1.62, and impedance, flash current and CCV were also improved.

EXAMPLE 7

The effect of treating depolarizer mixtures with a mild reducing solution containing tartaric acid was determined with both aqueous solutions and 30% KOH solutions containing 20% by weight of tartaric acid. Treatment times and temperatures were varied. All depolarizer mixtures contained 60% by weight AgO and 36.85% by weight of $Ag_2O$. All treatments with the mild reducing solution were performed by immersing the compressed pellet (not consolidated in the container) in the mild reducing solution. After the treatment, the pellets were rinsed in water, soaked in 30% KOH solution for 24 hours at room temperature, then rinsed in water and dried in hot air (about 50° C.) for about 10 minutes. Some of the pellets were used to make 4-10 RW 44 cells using a 40% KOH electrolyte containing 1% ZnO. Prior to assembly of the cells, the pellets were consolidated in the cathode container and treated with a strong reducing solution consisting of 1% by weight hydrazine in methanol for 3 minutes. Untreated pellets and pellets soaked in 30% KOH were used as standards. The following results were recorded:

| Reducing Solution | Temp. | Time | Soak in 30% KOH | Pellet Capacity mAH/g | Impedance (ohms) | Average OCV | CCV | Flash Current (amps) |
|---|---|---|---|---|---|---|---|---|
| None |  |  | Yes | 343 | 47.0 | 1.74 | 1.52 | 0.58 |
| 30% KOH | 80° C. | 5 min. | Yes | 345 | 44.8 | 1.75 | 1.52 | 0.55 |
| 20% Tart./$H_2O$ | 60° C. | 5 min. | Yes | 336 | 39.9 | 1.62 | 1.53 | 0.57 |
| 20% Tart./KOH | 80° C. | 5 min. | Yes | 198 | 58.1 | 1.62 | 1.52 | 0.17 |
| 20% Tart./KOH | RT | 1 min. | Yes | 337 | 51.3 | 1.63 | 1.52 | 0.56 |

The treatment with the tartaric acid solution lowered the OCV to 1.62 v. and the aqueous solution treatment also improved the impedance. However, the alkaline solution at 80° C for 5 minutes was too strong for the capacity was substantially reduced, the impedance was increased and the flash current was significantly lower.

As used in this specification and in the claims which follow, the terms "mild reducing solution" and "strong reducing solution" includes treatment with reducing agent vapors as well as the liquid solutions.

Having completely described my invention, I claim:

1. A method for manufacturing a stable divalent silver oxide depolarizer mix which comprises (1) forming a divalent silver oxide depolarizer mix containing divalent silver oxide, (2) compressing the depolarizer mix in a press to form a depolarizer mix pellet, (3) treating the depolarizer mix pellet with a mild reducing solution which is sufficiently mild that no substantial portion of the divalent silver oxide is reduced to silver under the treatment conditions, (4) consolidating the treatment depolarizer mix pellet in a cathode container by compressing it in the container, and (5) treating the consolidated depolarizer mix/cathode container assembly with a strong reducing solution to form a substantially continuous and electrolyte permeable layer of silver on the exposed surface of the depolarizer mix.

2. A method in accordance with claim 1 in which the treatment with the mild reducing solution is carried out for up to about 10 minutes and the treatment with the strong reducing solution is carried out for up to about 10 minutes.

3. A method in accordance with claim 1 in which a polytetrafluoroethylene binder and lubricant and monovalent silver oxide are mixed with the divalent silver oxide in step (1), and the divalent silver oxide content of the depolarizer blend is at least about 50% by weight.

4. A method in accordance with claim 1 in which the depolarizer mix pellet is dried after the treatment with the mild reducing solution and prior to consolidating the pellet in step (4).

5. A method for manufacturing a stable divalent silver oxide depolarizer mix which comprises (1) forming a divalent silver oxide depolarizer mix containing divalent silver oxide, (2) compressing the depolarizer mix in a press to form a depolarizer mix pellet, (3) treating the depolarizer mix pellet with a mild reducing solution consisting essentially of an alkaline solution of a loer aliphatic alcohol having up to eight carbon atoms, (4) consolidating the treated depolarizer mix pellet in a cathode container by compressing it in the container, and (5) treating the consolidated depolarizer mix/cathode container assembly with a strong reducing solution to form a substantially continuous and electrolyte permeable layer of silver on the exposed surface of the depolarizer mix.

6. A method in accordance with claim 5 in which the mild reducing solution consists essentially of an alkaline solution of methanol and the treatment with the mild reducing solution is carried out for up to about 10 minutes.

7. A method in accordance with claim 6 in which the strong reducing agent is a solution of hydrazine in methanol and the treatment in step (5) comprises immersing the consolidated depolarizer mix/cathode container assembly in the methanol solution of hydrazine for up to about 10 minutes.

8. A method for manufacturing a stable divalent silver oxide depolarizer mix which comprises (1) mixing divalent silver oxide and monovalent silver oxide to form a homogeneous depolarizer mix containing at least about 50% by weight of divalent silver oxide, (2) compressing the depolarizer mix to form a depolarizer mix pellet, (3) treating the depolarizer mix pellet with an alkaline solution of methanol, (4) drying the pellet, (5) consolidating the treated depolarizer mix pellet in a cathode container by compressing it in the container, and (6) treating the consolidated depolarizer mix/cathode container assembly with a solution of hydrazine in methanol to form a substantially continuous and electrolyte permeable layer of silver on the exposed surface of the depolarizer blend.

9. A method in accordance with claim 8 in which the depolarizer mix pellet is immersed in the alkaline solution of methanol for up to about 10 minutes in step (3) and the consolidated depolarizer mix/cathode container assembly is immersed in the solution of hydrazine for up to about 10 minutes in step (6).

10. A method for manufacturing a stable divalent silver oxide depolarizer mix which comprises (1) forming a divalent silver oxide depolarizer mix containing divalent silver oxide, (2) compressing the depolarizer mix in a press to form a depolarizer mix pellet, (3) consolidating the depolarizer mix pellet in a cathode container by compressing it in the container, (4) treating the consolidated depolarizer mix/cathode container assembly with a mild reducing solution which is sufficiently mild that no substantial portion of the divalent silver oxide is reduced to silver under the treatment conditions, and (5) treating the treated depolarizer mix/cathode container assembly with a strong reducing solution to form a substantially continuous and electrolyte permeable layer of silver on the exposed surface of the depolarizer blend.

11. A method in accordance with claim 10 in which the mild reducing solution is an alkaline solution of methanol and the strong reducing solution is a solution of hydrazine in methanol.

12. A method for manufacturing a stable divalent silver oxide depolarizer mix which comprises (1) forming a divalent silver oxide depolarizer mix containing divalent silver oxide, (2) compressing the depolarizer mix to form a depolarizer mix pellet, (3) treating the depolarizer mix pellet with a mild reducing solution which is sufficiently mild that no substantial portion of the divalent silver oxide is reduced to silver under the treatment conditions, (4) treating depolarizer mix pellet with a strong reducing solution to form a substantially continuous and electrolyte permeable layer of silver on the surface of the pellet, and (5) consolidating the depolarizer mix pellet with the layer of silver on its surface in a cathode container by compressing it in the container.

13. A method in accordance with claim 12 in which the depolarizer mix pellet is immersed in an alkaline solution of methanol for up to about 10 minutes in step (3) and the treated depolarizer mix is immersed in a solution of hydrazine in methanol for up to about 10 minutes in step (4).

14. A stable divalent silver oxide depolarizer mix made in accordance with claim 1.

15. A stable divalent silver oxide depolarizer mix made in accordance with claim 5.

16. A stable divalent silver oxide depolarizer mix made in accordance with claim 8.

17. A stable divalent silver oxide depolarizer mix made in accordance with claim 10.

18. A stable divalent silver oxide depolarizer mix made in accordance with claim 12.

* * * * *